United States Patent Office.

S. F. VAN CHOATE, OF BOSTON, MASSACHUSETTS.

Letters Patent No. 96,640, dated November 9, 1869.

IMPROVEMENT IN DISTILLING ALCOHOLIC LIQUORS.

The Schedule referred to in these Letters Patent and making part of the same.

*To all whom it may concern:*

Be it known that I, S. F. VAN CHOATE, of Boston, in the county of Suffolk, and State of Massachusetts, have made an invention of Improvements in Alcoholic Liquors; and do hereby declare the following to be a full, clear, and exact description thereof.

The invention comprising the subject-matter of this patent consists in the adoption and application of oxygen-gas to the substances or vapors of alcoholic spirits during the process of distillation, or otherwise, for neutralizing and removing the fusel-oil and other deleterious matter contained therein; this process being in self-evident contradistinction to the employment, now common for such purposes, of atmospheric air, in which only a comparatively small percentage, twenty one-hundredths, of pure oxygen is found existing, the eighty one-hundredths of hydrogen and nitrogen neutralizing to a great extent the beneficial action of oxygen, the proportioned preponderance of oxygen, in my process, being productive of a corresponding gain, both mechanically and chemically considered.

In carrying out my invention, a jet, current, or blast of oxygen-gas is to be introduced to and commingled with the vapor resulting from the vaporization of the liquor within the generator of the still, such vapor being contained in ordinary stills in that portion situated between the top of such generator and the beginning of the condensing-worm.

This act of introducing and commingling the oxygen may be effected in various ways, or by various mechanical means, but it is evident that pressure by means of a pump or other contrivance will be necessary.

While the liquid containing the alcohol is in a vaporous state, the fusel-oil, hydrate of amyle, and other obnoxious substances contained therein, are exposed, and presented to the action of the oxygen to a much more perfect degree than is possible when such substances are contained in liquid form, since such matters are mingled in the form of a vapor or vapors with alcoholic vapor.

At a suitable point near the condenser, exit is given to the carbonic-acid and other gases which are the resultant of the action of oxygen upon the deleterious matters in the alcoholic vapors.

We have now seen how the oxygen may be beneficially combined with the vaporous products of distillation, and it will undoubtedly be found, in the practical carrying out of my invention, that this mode of distributing the oxygen will be found the best.

I claim the application of practically-pure oxygen-gas to alcoholic vapors, for the purpose specified.

S. F. VAN CHOATE.

Witnesses:
FRED. CURTIS,
EDWARD GRIFFITH.